US010002084B1

(12) United States Patent
Warkentin et al.

(10) Patent No.: US 10,002,084 B1
(45) Date of Patent: Jun. 19, 2018

(54) MEMORY MANAGEMENT IN VIRTUALIZED COMPUTING SYSTEMS HAVING PROCESSORS WITH MORE THAN TWO HIERARCHICAL PRIVILEGE LEVELS

(71) Applicant: VMware, Inc., Palo Alto, CA (US)

(72) Inventors: Andrei Warkentin, Wakefield, MA (US); Cyprien Laplace, Cambridge, MA (US); Ye Li, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 0 days. days.

(21) Appl. No.: 15/383,572

(22) Filed: Dec. 19, 2016

(51) Int. Cl.

| | |
|---|---|
| ***G06F 12/14*** | (2006.01) |
| ***G06F 12/1027*** | (2016.01) |
| ***G06F 9/455*** | (2018.01) |
| ***G06F 12/1009*** | (2016.01) |

(52) U.S. Cl.
CPC ...... *G06F 12/1491* (2013.01); *G06F 9/45558* (2013.01); *G06F 12/1009* (2013.01); *G06F 12/1027* (2013.01); *G06F 2009/45583* (2013.01); *G06F 2212/1052* (2013.01); *G06F 2212/65* (2013.01); *G06F 2212/68* (2013.01)

(58) Field of Classification Search
None
See application file for complete search history.

(56) References Cited

U.S. PATENT DOCUMENTS

| | | | | |
|---|---|---|---|---|
| 9,720,717 B2 * | 8/2017 | Carson | ................ | G06F 9/45533 |
| 2006/0026383 A1 * | 2/2006 | Dinechin | .............. | G06F 12/109 711/207 |
| 2014/0282514 A1 * | 9/2014 | Carson | ................ | G06F 9/45533 718/1 |
| 2014/0372719 A1 * | 12/2014 | Lange | ................ | G06F 12/1483 711/163 |
| 2017/0193226 A1 * | 7/2017 | Lange | .................. | G06F 21/554 |
| 2017/0315832 A1 * | 11/2017 | Carson | ................ | G06F 9/45533 |

* cited by examiner

*Primary Examiner* — Kevin Verbrugge
(74) *Attorney, Agent, or Firm* — Patterson + Sheridan, LLP

(57) ABSTRACT

An example method of memory management in a virtualized computing system includes: generating a page table hierarchy that includes address translations to first pages of memory that store kernel software and second pages of the memory that store user software; configuring a processor to: 1) implement a first address translation scheme, which uses a first virtual address width, for a hypervisor privilege level; 2) implement a second address translation scheme, which uses a second virtual address width, for supervisor and user privilege levels, where the first virtual address width is larger than the second virtual address width; and 3) use the page table hierarchy for each of the first and second address translation schemes; and executing the kernel software at the hypervisor privilege level and the user software at the user privilege level.

20 Claims, 4 Drawing Sheets

MEMORY MANAGEMENT IN VIRTUALIZED COMPUTING SYSTEMS HAVING PROCESSORS WITH MORE THAN TWO HIERARCHICAL PRIVILEGE LEVELS

BACKGROUND

Computer virtualization is a technique that involves encapsulating a physical computing machine platform into virtual machine(s) executing under control of virtualization software on a hardware computing platform or "host" (collectively referred to as a "virtualized computing system"). A virtual machine (VM) provides virtual hardware abstractions for processor, memory, storage, and the like to a guest operating system (OS) and guest application(s) that run on the guest OS. The virtualization software, also referred to as a "hypervisor," includes one or more virtual machine monitors (VMMs) to provide execution environment(s) for the virtual machine(s). The hypervisor itself can be an OS having a kernel and user applications that run on the kernel. Thus, a virtualized computing system can include various software components executing on the hardware, including the hypervisor kernel, hypervisor user application(s), guest OS(s), and guest application(s).

Some central processing unit(s) execute code at multiple hierarchical privilege levels, each of which provides a different set of constraints. Examples include CPUs compatible with the ARM®v7 and ARM®v8 (Instruction Set Architecture versions 7 and 8) hardware architectures, which are commercially available from ARM Holdings of Cambridge, England. The various software components of a virtualized computing system can execute at different privilege levels of the hardware architecture.

As part of transitioning execution control from one software component to another, the hypervisor performs a context switch, i.e., storing and restoring component-specific state, such as memory and processor state. Context switches have a performance impact that requires careful optimization and mitigation. Efficient management of page tables, exception vectors (i.e., fixed memory addresses to which execution is directed in response to interrupts and other processor exception events), and the like to optimize context switches across various software components noticeably improves the performance of the virtualized computing system. To perform efficient context switches in architectures with multiple hierarchical privilege levels, a strategy that judiciously assigns and manages hypervisor components across the privilege levels is desirable.

SUMMARY

One or more embodiments provide memory management in virtualized computing systems having processors with more than two hierarchical privilege levels. In an embodiment, a method of memory management in a virtualized computing system is described. The virtualized computing system includes a hypervisor executing on a hardware platform, where the hardware platform includes a processor and a memory, and the hypervisor includes kernel code and user code. The method includes: generating a page table hierarchy that includes address translations to first pages of the memory that store the kernel software and second pages of the memory that store the user software; configuring the processor to: 1) implement a first address translation scheme, which uses a first virtual address width, for a hypervisor privilege level; 2) implement a second address translation scheme, which uses a second virtual address width, for supervisor and user privilege levels, where the first virtual address width is larger than the second virtual address width; and 3) use the page table hierarchy for each of the first and second address translation schemes; and executing the kernel software at the hypervisor privilege level and the user software at the user privilege level.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
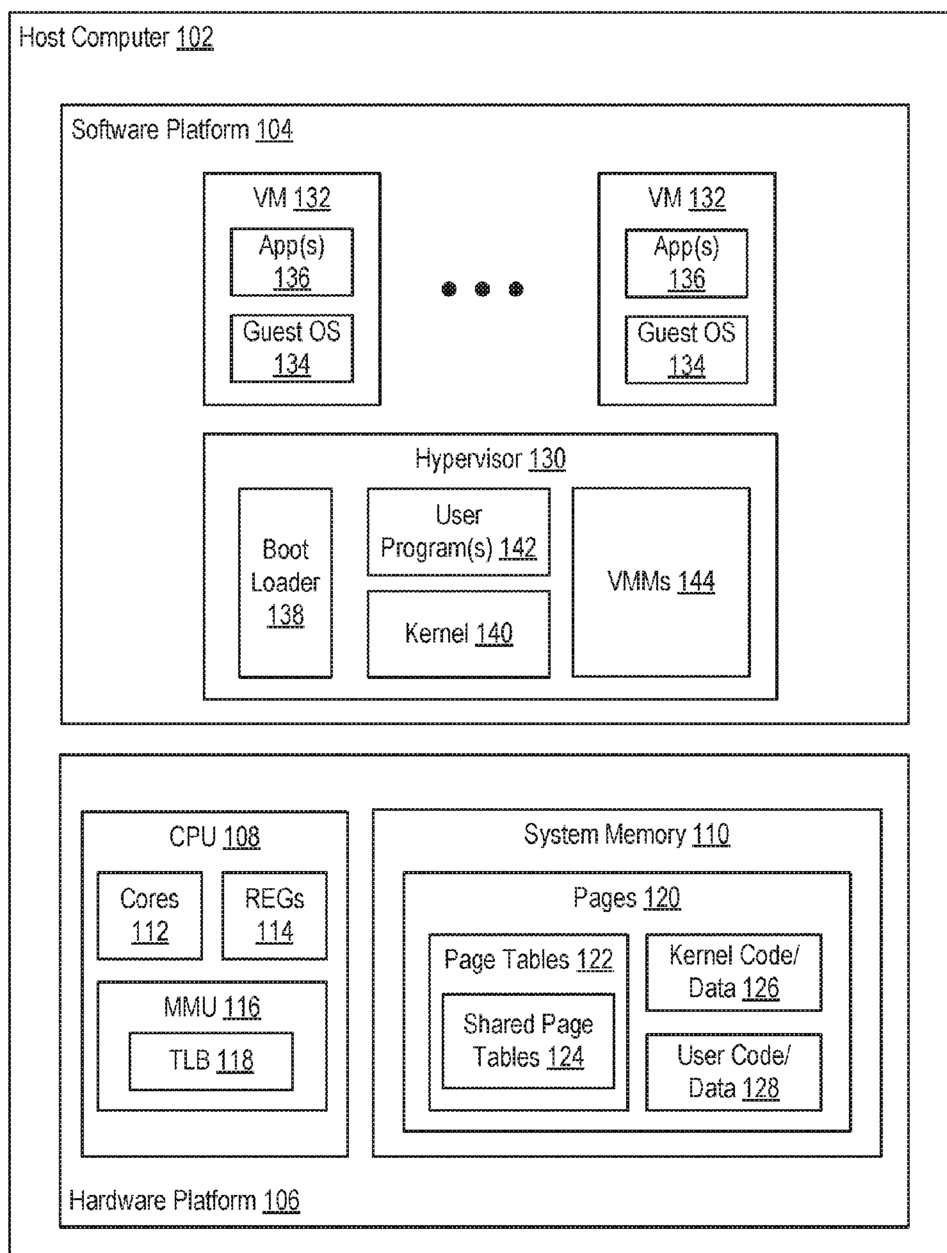
FIG. 1 is a block diagram depicting a virtualized computing system according to an embodiment.

FIG. 1 is a block diagram depicting a virtualized computing system 100 according to an embodiment. Virtualized computing system 100 includes a host computer 102 having a software platform 104 executing on a hardware platform 106. Hardware platform 106 may include conventional components of a computing device, such as a central processing unit (CPU) 108 and system memory 110, as well as a storage system (storage), input/output devices, and the like (not shown). CPU 108 is configured to execute instructions, for example, executable instructions that perform one or more operations described herein and may be stored in system memory 110 and the storage system. System memory 110 is a device allowing information, such as executable instructions, virtual disks, configurations, and other data, to be stored and retrieved. System memory 110 may include, for example, one or more random access memory (RAM) modules.

CPU 108 includes one or more cores 112, various registers 114, and a memory management unit (MMU) 116. Each core 112 is a microprocessor or like type processor element. Registers 114 include program execution registers for use by code executing on cores 112 and system/control registers for use by code to configure CPU 108. Code is executed by CPU 108 on a core 112 at a particular privilege level (PL) of a hierarchy of privilege levels. In an embodiment, CPU 108 is compliant with the ARM®v8 architecture or the like that includes four exception levels (ELs), which are defined as EL0, EL1, EL2, and EL3 in order of increasing code-execution privilege. Execution at EL0 is referred to as "unprivileged execution" and execution at any of EL1, EL2, and EL3 is referred to as "privileged execution." EL0 is an example of a "user PL;" EL1 is an example of a "supervisor PL;" EL2 is an example of a "hypervisor PL;" and EL3 is an example of a "secure PL." In general, CPU 108 supports a hierarchy of at least three hierarchical privilege levels, including the user PL, the supervisor PL, and the hypervisor PL in order of increasing execution privilege. Various examples described herein refer to a CPU having the ARM®v8 hardware architecture and executing in the 64-bit execution state (referred to as AArch64). It is to be understood that the memory management techniques described herein can be employed with CPUs having similar hardware architectures.

MMU 116 implements memory management in the form of paging of system memory 110. MMU 116 controls address translation and access permissions for memory accesses made by cores 112. MMU 116 implements a plurality of address translation schemes based on privilege level (also referred to as "translation schemes"). Each translation scheme generally takes an input address (IA) and, if permitted based on the defined access permissions, returns an output address (OA). If an address translation cannot be performed (e.g., due to violation of the access permissions), MMU 116 generates an exception. MMU 116 is controlled by a plurality system registers in registers 114.

One type of translation scheme includes a single stage of address translation that receives a virtual address (VA) in a virtual address space and outputs a physical address (PA) in a physical address space. The virtual address space is a logical address space managed by software and the physical address space includes the physical memory map of system memory 110. Another type of translation scheme includes two stages of address translation. The first stage of address translation receives a VA and outputs an intermediate physical address (IPA) in an intermediate physical address space. The second stage of address translation receives an IPA and outputs a PA. The IPA address space is a logical address space managed by software. In general, each translation scheme maps a VA to a PA using one or two stages of address translation. MMU 116 can include a translation lookaside buffer (TLB) 118 that caches address translations.

MMU 116 implements different translation schemes depending on privilege level. For example, CPUs compliant with the ARM®v8 architecture include a single stage translation scheme for code executing at EL2 (referred to herein as the "EL2 translation scheme"). The EL2 translation scheme includes a single stage that maps VAs to PAs and is controlled from EL2. Such CPUs also include a two-stage translation scheme for code executing at EL1 and EL0 (referred to herein as the "EL1/EL0 translation scheme"). The first stage of the EL1/EL0 translation scheme maps VAs to IPAs and is controlled from EL1. The second stage of the EL1/EL0 translation scheme maps IPAs to PAs and is controlled from EL2. In general, MMU 116 implements a hypervisor PL translation scheme having a single stage and a supervisor/user PL translation scheme having one or two stages. The translation scheme stages can be enabled/disabled by setting fields in particular registers 114.

Figure 2:
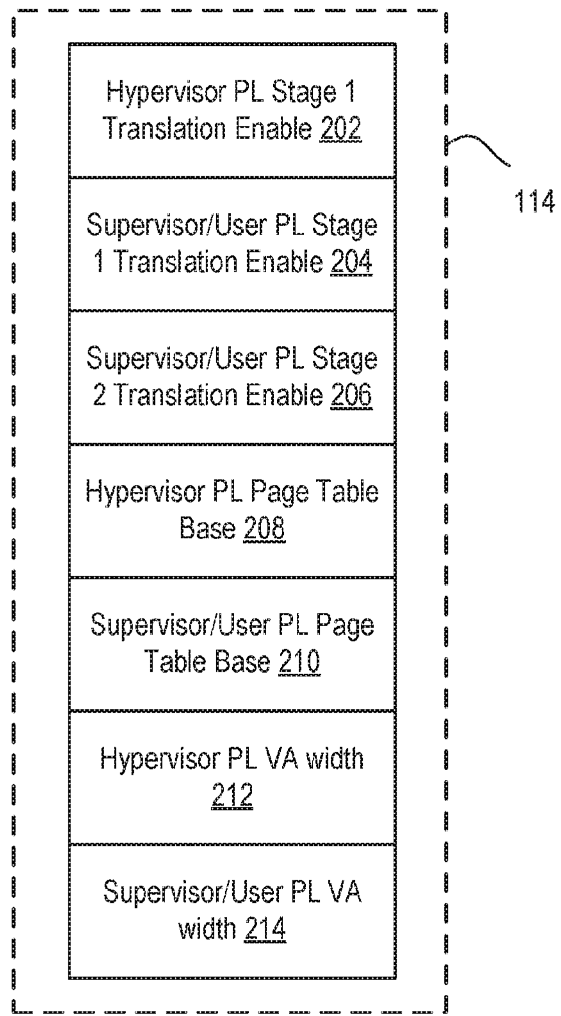
FIG. 2 is a block diagram depicting example fields in one or more of registers according to an embodiment.

FIG. 2 is a block diagram depicting example fields in one or more of registers 114 according to an embodiment. The fields include a hypervisor PL stage 1 translation enable field 202 that enables/disables stage 1 of the hypervisor PL translation scheme (the only stage in that scheme). The fields include a supervisor/user PL stage 1 translation enable field 204 that enables/disables stage 1 of the supervisor/user PL translation scheme. The fields include a supervisor/user PL stage 2 translation enable field 206 that enables/disables stage 2 of the supervisor/user PL translation scheme. Code executing at the hypervisor PL can manipulate any of the fields 202 through 206. Code executing at the supervisor PL can manipulate only the supervisor/user PL stage 1 translation enable field 204. Code executing at the user PL cannot manipulate any of the fields 202 through 206. For example, the ARM®v8 architecture describes a field M in a register SCTLR_EL2 that enables/disables EL2 stage 1 address translation; a field M in a register SCTLR_EL1 that enables/disables EL1/EL0 stage 1 address translation; and a field VM in a register HCR_EL2 that enables/disables EL1/EL0 stage 2 address translation.

Returning to FIG. 1, MMU 116 divides system memory 110 into pages 120. A "page" is the smallest block of memory for which an IA-to-OA mapping can be specified. Each page (also referred to herein as a "memory page") includes a plurality of separately addressable data words, each of which in turn includes one or more bytes. Each address includes a set of most significant bits (MSBs) that specifies a memory page and a set of least significant bits that specifies an offset into the memory page. Each address translation involves translating a set of MSBs of the IA into a set of MSBs of an OA. CPU 108 can support one or more page sizes. For example, CPUs compliant with the ARM®v8 architecture can support 4 kilobyte (KB), 16 KB, and 64 KB translation granules, which are the minimum page sizes that can be translated (software configurable). CPUs compliant with the ARM®v8 architecture can also translate large pages (regions or blocks), such as 2 megabyte (MB) and 1 gigabyte (GB) regions for the 4 KB granule size, 32 MB regions for the 16 KB granule size, and 512 MB regions for the 64 KB granule size. Other CPUs may support other page sizes. In addition, the width of the IA is configurable for each address translation scheme. In embodiments, the VA address width for stage 1 of the supervisor/user PL translation scheme is less than that of stage 1 of the hypervisor PL translation scheme, as described further below.

Each enabled stage of address translation in a translation scheme uses memory mapped tables referred to as page tables 122. A given address translation requires one or more lookups of page tables 122 (referred to as one or more levels of lookup). A page table walk is the set of lookups required to translate a VA to a PA. Page tables 122 are organized into hierarchies, where each page table hierarchy includes a base table and a plurality of additional tables corresponding to one or more additional levels. For example, the ARM®v8 architecture specifies up to four levels of page tables referred to as level 0 through level 3 tables. The number of levels in a page table hierarchy depends on the page size and the width of the IA.

As shown in FIG. 2, the fields of registers 114 include a hypervisor PL page table base field 208 that stores a physical address of a base page table for use with the hypervisor PL translation scheme. The fields also include a supervisor/user PL page table base field 210 that stores a physical address of a base page table for use with the supervisor/user PL translation scheme. The fields further include a hypervisor PL VA width field 212 that specifies the width of VAs for the hypervisor PL translation scheme. The fields further include a supervisor/user PL VA width field 214 that specifies the width of VAs for the supervisor/user PL translation scheme. Code executing at the hypervisor PL can manipulate any of the fields 208 through 214. Code executing at the supervisor PL can manipulate only the fields 210 and 214. Code executing at the user PL cannot manipulate any of the fields 210 through 214.

For example, the ARM®v8 architecture specifies a register TTBR0_EL2 that stores an address of a base page table for EL2 stage 1 address translations and a register TTBR0_EL1 that stores an address of a base page table for EL1/EL0 stage 1 address translations. The ARM®v8 architecture further specifies a register VTTBR_EL2 that stores an address of a base page table for EL1/EL0 stage 2 address translations. The ARM®v8 architecture further specifies a field T0SZ in a register TCR_EL2 that dictates the VA width for the EL2 address translation scheme. Likewise, the ARM®v8 architecture specifies a field T0SZ in a register TCR_EL1 that dictates the VA width for the EL1/EL0 address translation scheme. In the ARM®v8 architecture, the maximum width of any IA is 48 bits. Other CPUs can have other maximum IA widths. For the EL2 address translation scheme, the 48-bit virtual address space ranges from 0x0000_0000_0000_0000 to 0x0000_FFFF_FFFF_FFFF (where the prefix "0x" denotes a hexadecimal number). Note that the virtual address space for the EL1/EL0 address translation scheme is split into two 48-bit subranges within a full 64-bit address range: the bottom 48-bit VA subrange is between 0x0000_0000_0000_0000 and 0x0000_FFFF_FFFF_FFFF and the top 48-bit VA subrange is between 0xFFFF_0000_0000_0000 and 0xFFFF_FFFF_FFFF_FFFF. The register TTBR0_EL1 stores an address of a base page table for the bottom 48-bit subrange of the EL1/EL0 stage 1 translation scheme. A register TTBR1 EL1 stores an address of a base page table for the top 48-bit subrange of the EL1/EL0 stage 1 translation scheme.

Figure 3:
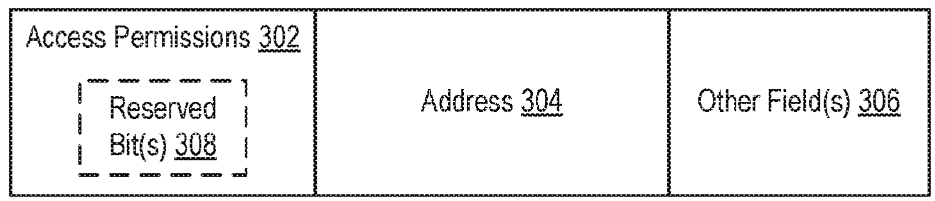
FIG. 3 is a block diagram depicting a page table descriptor according to an embodiment.

Returning to FIG. 1, each page table 122 includes a set of descriptors. Each descriptor generally includes an address and access permissions associated with the address. Depending on the level of the page table, each descriptor can describe another page table, a block of memory (e.g., a block of multiple pages), or a page. FIG. 3 is a block diagram depicting a page table descriptor 300 according to an embodiment. Page table descriptor 300 includes access permissions field 302 and an address field 304. Access permissions field 302 can include read, write, and execute permissions. Address field 302 includes an OA that references another page table, a block of pages, or a page, depending on the level of the corresponding page table. Page table descriptor 300 can include various other field(s) 306, such as memory attribute fields (e.g., memory attributes that control the memory type, access to caches, whether the memory is coherent, etc.).

The format of page table descriptor 300 can differ depending on the particular translation scheme. In embodiments, access permissions 302 have a different format in the hypervisor PL translation scheme versus the supervisor/user PL translation scheme. In the supervisor/user PL translation scheme, access permissions 302 can specify read, write, and execute access differently for unprivileged execution versus privileged execution. In the hypervisor PL translation scheme, access permissions 302 can specify read, write, and execute access regardless of privilege. Thus, in the hypervisor PL translation scheme, access permissions 302 include one or more reserved bits 308 that effectively disable any distinction between unprivileged and privileged execution.

Returning to FIG. 1, software platform 104 includes a virtualization layer that abstracts processor, memory, storage, and networking resources of hardware platform 106 into one or more virtual machines ("VMs") 132 that run concurrently on host computer 102. VMs 132 run on top of the virtualization layer, referred to herein as a hypervisor 130, which enables sharing of the hardware resources by VMs 132. One example of hypervisor 130 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein).

Each VM 132 supported by hypervisor 130 includes guest software (also referred to as guest code) that runs on the virtualized resources supported by hardware platform 106. In the example shown, the guest software of each VM 132 includes a guest OS 134 and one or more applications (apps) 136. Guest OS 134 can be any commodity operating system known in the art, such as such as Linux®, Microsoft Windows®, Mac OS®, or the like.

Hypervisor 130 includes a boot loader 138, a kernel 140, one or more user programs 142, and virtual machine monitors (VMMs) 144. In alternative embodiments, hypervisor 130 can include any number of components and the functionality implemented by boot loader 138, kernel 140, user program(s) 142, and VMMs 144 may be distributed in any technically feasible manner between the hypervisor components.

Kernel 140 provides operating system functionality (e.g., process creation and control, file system, process threads, etc.), as well as CPU scheduling and memory scheduling across guest software in VMs 132, VMMs 144, and user program(s) 142. VMMs 144 implement the virtual system support needed to coordinate operations between hypervisor 130 and VMs 132. Each VMM 144 manages a corresponding virtual hardware platform that includes emulated hardware, such as virtual CPUs (vCPUs) and guest physical memory. Each virtual hardware platform supports the installation of guest software in a corresponding VM 132.

Each user program 142 is a "native" process that runs on kernel 140. User program(s) 142 execute in an environment provided by kernel 140, but outside of environments provided for VMs 132. For example, in some embodiments, each VMM 140 is paired with a corresponding process, known as a VMX process, which executes as a user program 142. In some embodiments, each VMM may be created by, entered into, and exited via the paired VMX application. In another embodiment, a direct console user interface (DCUI) process, which can be used to configure hypervisor 130, executes as a user program 142.

Boot loader 138 includes code that is executed upon power on or reset of hardware platform 106. Boot loader 138 can include one or more stages that setup CPU 108 and load kernel 140 into system memory 110. In particular, boot loader 138 can configure MMU 116 to manage memory, as described further herein. Alternatively, some or all of the functions implemented by boot loader 138 to configure MMU 116 can be performed by kernel 140 after boot loader 138 loads and executes kernel 140.

In an embodiment, boot loader 138 configures CPU 108 to implement the hypervisor, supervisor, and user PLs. Boot loader 138 configures kernel 140 to execute at the hypervisor PL (e.g., EL2). Kernel 140 configures VMMs 144 to execute at the hypervisor PL. VMMs 144 configure guest OS 134 in each VM 132 to execute at the supervisor PL (e.g., EL1). Guest OS 134 in each VM 132 configures applications 136 to execute at the user PL (e.g., EL0). Kernel 140 configures user program(s) 142 to execute at the user PL (e.g., EL0). Thus, outside of the context of a VM, virtualized computing system 100 includes kernel 140 executing at the hypervisor PL (e.g., EL2) and user program(s) 142 executing at the user PL (e.g., EL0).

Kernel 140 includes kernel code and data (kernel code/data 126) that are stored in pages 120 of system memory 110. Likewise, user program(s) 142 include user code and data (user code/data 128) that are stored in pages 120 of system memory 110. Kernel code/data 126 is generally referred to as "kernel software," and user code/data 128 is generally referred to as "user software." Guest software executing in VMs 132 (e.g., guest OS 132), VMMs 144, boot loader 138, and/or kernel 140 can generate page tables 122, which are also stored in pages 120. In particular, page tables 122 include shared page tables 124. As discussed further below, kernel 140 can create and manipulate shared page tables 124 that are shared between kernel 140 and user program(s) 142.

As discussed above, MMU 116 uses two different translation schemes for code executing at the hypervisor PL versus code executing at the user PL. At the hypervisor PL, MMU 116 implements a single-stage translation scheme that maps VAs to PAs and requires page table descriptors having a first format (e.g., page table descriptor 300 with reserved bit(s) 308). At the user PL, MMU 116 implements a single-stage or two-stage translation scheme that maps VAs to PAs. Stage one of the supervisor/user PL translation scheme requires page table descriptors similar to those of stage one of the hypervisor PL translation scheme, but without reserving reserved bit(s) 308. Stage two of the supervisor/user PL translation scheme requires a different format for page table descriptors that is incompatible with stage one address translations.

In one scenario, there are three types of page table hierarchies: a first type page table hierarchy for stage one of the hypervisor PL translation scheme (e.g., stage one of the EL2 translation scheme); a second type of page table hierarchy for stage one of the supervisor/user PL translation scheme (e.g., stage one of the EL1/EL0 translation scheme); and a third type of page table hierarchy for stage two of the supervisor/user PL translation scheme (e.g., stage 2 of the EL1/EL0 translation scheme). Alternatively, stage one of the EL1/EL0 translation scheme can be disabled (by disabling EL1), which forces EL0 translations to be done using stage 2 of the EL1/EL0 translation scheme. Such scenarios are inefficient. Since user program(s) 142 do not execute within the context of a VM there is no concept of guest physical memory. Thus, there is no need for the second stage of the supervisor/user PL translation scheme.

In a third scenario, the second stage of the supervisor/user PL translation scheme is disabled. A first type of page table hierarchy is established for stage one of the hypervisor PL translation scheme and a second type of page table hierarchy is established for stage one of the supervisor/user PL translation scheme. Each stage-one translation scheme maps VAs to PAs and uses page table descriptors having a similar format (with the exception of reserved bit(s) 308). However, in this scenario, kernel 140 must replicate the mappings associated with user/code data 128 across both page table hierarchies for the hypervisor PL (e.g., EL2) and the supervisor/user PL (e.g., EL1/EL0). Otherwise, kernel 140 would not be able to access user code/data 128. The duplicate mappings still result in an inefficient memory management scheme.

The third scenario described above can be modified to share a portion of the supervisor/user PL page table hierarchy with the hypervisor PL page table hierarchy. In such a modified scenario, hypervisor PL page table base register 208 and supervisor/user PL page table base register 210 each point to different base page tables. The base page table for the supervisor/user PL page table hierarchy includes only descriptors for mappings to user code/data 128. The base page table for the hypervisor PL page table hierarchy includes descriptors for mappings to kernel code/data 126, as well as replicated descriptors for mappings to user code/data 128. The replicated user code/data descriptors point to the supervisor/user PL page table hierarchy. However, in this modified scenario, kernel 140 must ensure that none of the mappings to kernel code/data 126 make it to the base page table of the supervisor/user PL page table hierarchy. Otherwise, user program(s) 142 would be able to access kernel code/data 126. Thus, extra code must be written and maintained for kernel 140 in order to perform this software-based management of the page tables.

Figure 4:
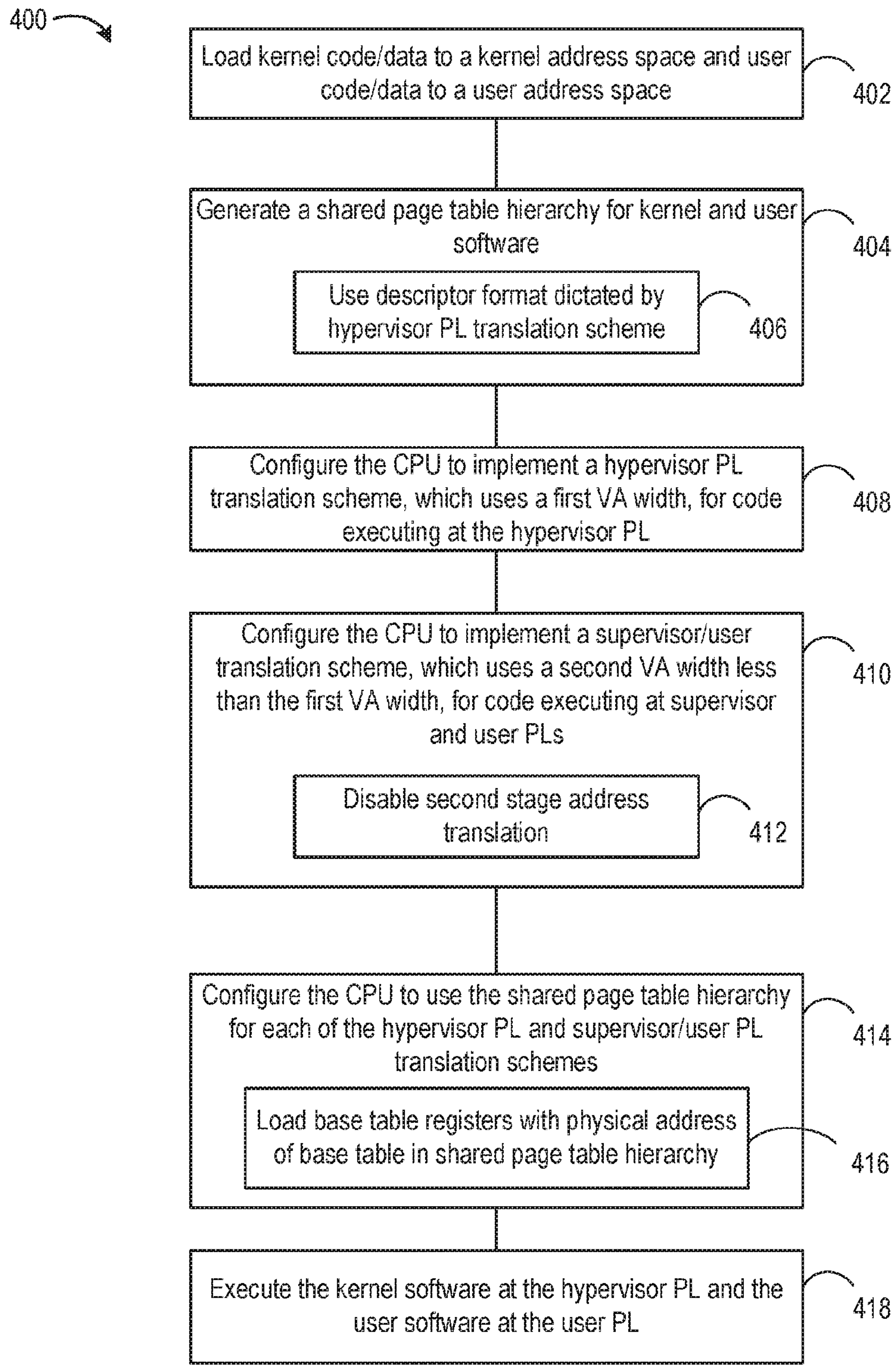
FIG. 4 is a flow diagram depicting a method of memory management in a virtualized computing system according to an embodiment.

FIG. 4 is a flow diagram depicting a method 400 of memory management in a virtualized computing system according to an embodiment. Method 400 may be performed by hypervisor 130 executing in virtualized computing system 100 of FIG. 1. Steps in method 400 may be performed by kernel 140. Method 400 begins at step 402, where hypervisor 130 stores kernel code/data 126 in pages 120 of a kernel address space and user code/data 128 in pages 120 of a user address space. Additional steps of method 400 are described further below. An example memory map is now described with respect to FIG. 5.

Figure 5:
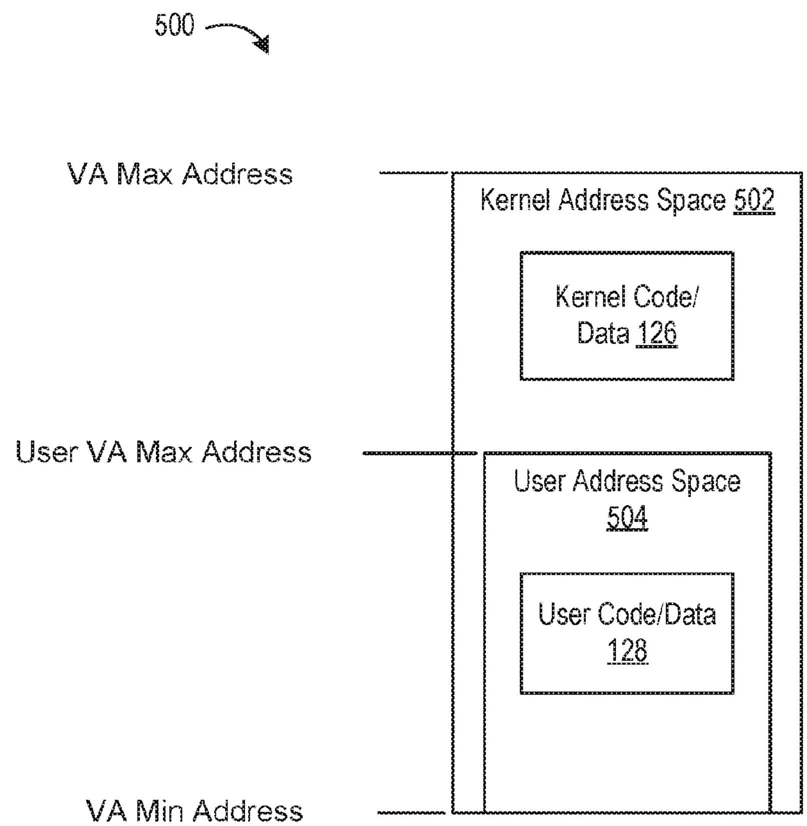
FIG. 5 is a block diagram depicting a memory map according to an embodiment.

FIG. 5 is a block diagram depicting a memory map 500 according to an embodiment. Memory map 500 includes a kernel address space 502. Kernel address space 502 ranges from a minimum VA address to a maximum VA address in a VA space defined by a kernel VA width. For example, the kernel VA width can be 48 bits, the minimum VA address can be 0x0000_0000_0000_0000, and the maximum address can be 0x0000 FFFF_FFFF_FFFF. Kernel VA width can be other values resulting in a smaller or larger VA address range. Kernel address space 502 includes a user address space 504. User address space 504 ranges from the minimum VA address to a maximum user VA address in a VA address space defined by a user VA width. For example, the user VA width can be 46 bits and the maximum user VA address can be 0x0000_3FFF_FFFF_FFFF. The user VA width can be other values resulting in a smaller or larger user VA address range as constrained by the kernel VA address range. Kernel code/data 126 is stored within kernel address space 502, but outside of user address space 504. In the examples above, kernel code/data 126 can be stored starting at 0x0000_4000_0000_0000. User code/data 128 is stored within user address space 504. In the example above, user code/data 128 is stored below at or below 0x0000_3FFF_0000_0000.

Returning to FIG. 4, at step 404, hypervisor 130 generates a shared page table hierarchy for kernel and user software. For purposes of clarity by example, method 400 is described in terms of a single shared page table hierarchy. However, it should be understood that kernel 140 can generate multiple shared page table hierarchies corresponding to multiple user programs 142 (e.g., one shared hierarchy per user program 142). The shared page table includes both mappings to kernel code/data 126 and mappings to user code/data 128. In an embodiment, the shared page table hierarchy includes descriptors having a format dictated by the hypervisor PL translation scheme (e.g., the stage 1 EL2 translation scheme for ARM®v8) (step 406). Additional steps of method 400 are described further below. An example shared page table hierarchy is now described with respect to FIG. 6.

Figure 6:
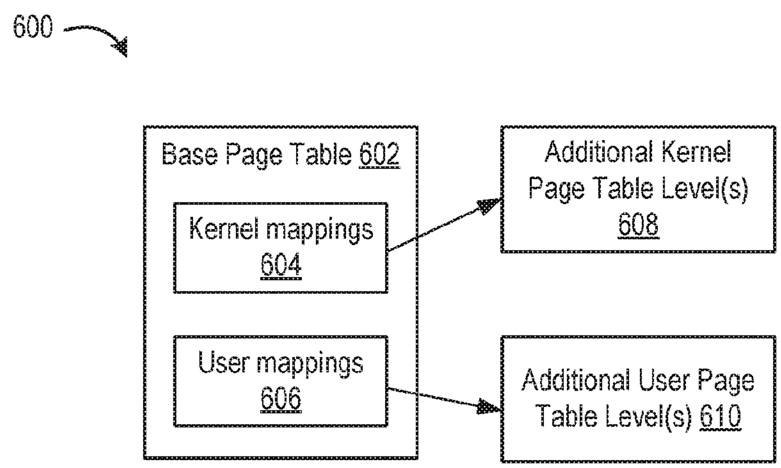
FIG. 6 is a block diagram depicting a shared page table hierarchy according to an embodiment.

FIG. 6 is a block diagram depicting a shared page table hierarchy 600 according to an embodiment. Shared page table hierarchy 600 includes a base page table 602. Base page table 602 includes descriptors for VAs between the minimum VA address and the maximum VA address of kernel address space 502. The descriptors are in the format dictated by the hypervisor PL translation scheme (e.g., the descriptor 300 having reserved bits 308). The descriptors in base page table 602 provide kernel mappings 604 and user mappings 606. Kernel mappings 604 correspond to VAs between the maximum user VA address (exclusive) and the maximum VA address (inclusive). User mappings 606 correspond to VAs between the minimum VA address (inclusive) and the maximum user VA address (inclusive). Kernel mappings 604 point to additional page tables in additional kernel page table level(s) 608. User mappings 606 point to additional page tables in additional user page table level(s) 610. The page tables in additional kernel page table level(s) 608 include mappings that result in address translations to kernel code/data 126. The page tables in additional user page table level(s) 610 include mappings that result in address translations to user code/data 128.

Returning to FIG. 4, at step 408, hypervisor 130 configures CPU 108 to implement a hypervisor PL translation scheme, which uses the kernel VA width, for code executing at the hypervisor PL. Hypervisor 130 performs such configuration by manipulating one or more registers 114, e.g., hypervisor PL stage 1 translation enable 202 and hypervisor PL VA width 212. For example, hypervisor 130 can configure CPU 108 to implement stage 1 of the EL2 translation scheme with a VA width of 48 bits for code executing at EL2 (e.g., kernel 140).

At step 410, hypervisor 130 configures CPU 108 to implement a supervisor/user translation scheme, which uses a second VA width that is less than the first VA width, for code executing at the supervisor and user PLs. Hypervisor 130 performs such configuration by manipulating one or more registers 114, e.g., supervisor/user PL stage 1 translation enable 204 and supervisor/user PL VA width 214. At step 412, hypervisor 130 disables second stage address translation (e.g., by manipulating supervisor/user PL stage 2 translation enable 206). For example, hypervisor 130 can configure CPU 108 to implement stage 1 of the EL1/EL0 translation scheme with a VA width of 46 bits for code executing at EL0 (e.g., user programs(s) 142). Hypervisor 130 can configure CPU 108 to disable stage 2 of the EL1/EL0 translation scheme.

At step 414, hypervisor 130 configures CPU 108 to use the shared page table hierarchy for each of the hypervisor PL and supervisor/user PL translation schemes. Hypervisor 130 performs such configuration by manipulating one or more registers 114, e.g., hypervisor PL page table base 208 and supervisor/user PL page table base 210 (step 416). Each page table base register stores an address of the base page table of the shared page table hierarchy (e.g., base page table 602).

At step 418, hypervisor 130 executes kernel 140 at the hypervisor PL (e.g., EL2) and user program(s) 142 at the user PL (e.g., EL0). In an embodiment, outside of the context of VMs 132, hypervisor 130 does not execute code at the supervisor PL (e.g., EL1). In this manner, user program(s) 142 access shared page tables 124 using the user VA address width and kernel 140 accesses shared page tables 124 using the kernel VA address width. If user program(s) 142 attempt to translate a VA mapped to kernel code/data 126, MMU 116 issues a fault, since kernel code/data 126 is stored at VAs outside of the user VA address range. Kernel 140 can translate VAs mapped to the entire VA address space (e.g., to access both kernel code/data 126 and user code/data 128).

Accordingly, hypervisor 130 efficiently manages shared page tables for both kernel 140 and user program(s) 142 using hardware features of CPU 108. Kernel 140 does not require extra code to ensure that kernel mappings are not accessible by user program(s) 142. Rather, MMU 116 will issue a fault if user program(s) 142 attempt to translate a VA that is mapped to kernel code/data 126. The only requirement is that hypervisor 130 stores kernel code/data 126 outside of the user VA address space. Note that hypervisor 130 can generate any number of shared page table hierarchies for any number of user program(s) 142. Hypervisor 130 can manipulate base page table registers of CPU 108 for context switches between user programs 142 to refer to the different shared page tables. For each context switch, the base page table registers refer to the same base page table in a given shared page table hierarchy. Hypervisor 130 does not need to maintain separate base page tables for kernel and user programs.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of memory management in a virtualized computing system that includes a hypervisor executing on a hardware platform, the hardware platform including a processor and a memory, the hypervisor including kernel software and user software, the method comprising:

generating a page table hierarchy that includes address translations to first pages of the memory that store the kernel software and second pages of the memory that store the user software;

configuring the processor to: 1) implement a first address translation scheme, which uses a first virtual address width, for a hypervisor privilege level; 2) implement a second address translation scheme, which uses a second virtual address width, for supervisor and user privilege levels, where the first virtual address width is larger than the second virtual address width; and 3) use the page table hierarchy for each of the first and second address translation schemes; and executing the kernel software at the hypervisor privilege level and the user software at the user privilege level.

2. The method of claim 1, wherein the first pages of the memory are within a portion of a first address space defined by the first virtual address width, the portion exclusive of a second address space defined by the second virtual address width, and wherein the second pages of the memory are within the second address space.

3. The method of claim 1, wherein descriptors of the page table hierarchy have a format dictated by the first address translation scheme.

4. The method of claim 3, wherein the format of the descriptors is not modified for use with the second address translation scheme.

5. The method of claim 1, wherein a first stage of the second address translation scheme performs virtual-to-physical address translations, and wherein the step of configuring the processor to implement the second address translation scheme comprises:

disabling a second stage of the second address translation scheme.

6. The method of claim 1, wherein the step of configuring the processor to use the page table hierarchy comprises:

setting each of a first register associated with the first address translation scheme, and a second register associated with the second address translation scheme, to a physical address of a base table of the page table hierarchy.

7. The method of claim 1, wherein the step of configuring the processor to implement the second address translation scheme comprises:

setting a register associated with the second address translation scheme to specify the second virtual address width.

8. A non-transitory computer readable medium having instructions stored thereon that when executed by a processor cause the processor to perform a method of memory management in a virtualized computing system that includes a hypervisor executing on a hardware platform, the hardware platform including the processor and a memory, the hypervisor including kernel software and user software, the method comprising:

generating a page table hierarchy that includes address translations to first pages of the memory that store the kernel software and second pages of the memory that store the user software;

configuring the processor to: 1) implement a first address translation scheme, which uses a first virtual address width, for a hypervisor privilege level; 2) implement a second address translation scheme, which uses a second virtual address width, for supervisor and user privilege levels, where the first virtual address width is larger than the second virtual address width; and 3) use the page table hierarchy for each of the first and second address translation schemes; and executing the kernel software at the hypervisor privilege level and the user software at the user privilege level.

9. The non-transitory computer readable medium of claim 8, wherein the first pages of the memory are within a portion of a first address space defined by the first virtual address width, the portion exclusive of a second address space defined by the second virtual address width, and wherein the second pages of the memory are within the second address space.

10. The non-transitory computer readable medium of claim 8, wherein descriptors of the page table hierarchy have a format dictated by the first address translation scheme.

11. The non-transitory computer readable medium of claim 10, wherein the format of the descriptors is not modified for use with the second address translation scheme.

12. The non-transitory computer readable medium of claim 10, wherein a first stage of the second address translation scheme performs virtual-to-physical address translations, and wherein the step of configuring the processor to implement the second address translation scheme comprises:

disabling a second stage of the second address translation scheme.

13. The non-transitory computer readable medium of claim 8, wherein the step of configuring the processor to use the page table hierarchy comprises:

setting each of a first register associated with the first address translation scheme, and a second register associated with the second address translation scheme, to a physical address of a base table of the page table hierarchy.

14. The non-transitory computer readable medium of claim 8, wherein the step of configuring the processor to implement the second address translation scheme comprises:

setting a register associated with the second address translation scheme to specify the second virtual address width.

15. A virtualized computing system, comprising:

a hardware platform including a processor and memory; and a software platform executing on the hardware platform, the software platform including a hypervisor having kernel software and user software, the hypervisor executable by the processor to:

generate a page table hierarchy that includes address translations to first pages of the memory that store the kernel software and second pages of the memory that store the user software;

configure the processor to: 1) implement a first address translation scheme, which uses a first virtual address width, for a hypervisor privilege level; 2) implement a second address translation scheme, which uses a second virtual address width, for supervisor and user privilege levels, where the first virtual address width is larger than the second virtual address width; and 3) use the page table hierarchy for each of the first and second address translation schemes; and execute the kernel software at the hypervisor privilege level and the user software at the user privilege level.

16. The virtualized computing system of claim 15, wherein the first pages of the memory are within a portion of a first address space defined by the first virtual address width, the portion exclusive of a second address space defined by the second virtual address width, and wherein the second pages of the memory are within the second address space.

17. The virtualized computing system of claim 15, wherein descriptors of the page table hierarchy have a format dictated by the first address translation scheme and wherein the format of the descriptors is not modified for use with the second address translation scheme.

18. The virtualized computing system of claim 15, wherein a first stage of the second address translation scheme performs virtual-to-physical address translations, and wherein the hypervisor is executable by the processor to disable a second stage of the second address translation scheme.

19. The virtualized computing system of claim 15, wherein the hypervisor is executable by the processor to set each of a first register associated with the first address translation scheme, and a second register associated with the second address translation scheme, to a physical address of a base table of the page table hierarchy.

20. The virtualized computing system of claim 15, wherein the hypervisor is executable by the processor to set a register associated with the second address translation scheme to specify the second virtual address width.

* * * * *